US010936914B2

(12) United States Patent
Toor et al.

(10) Patent No.: US 10,936,914 B2
(45) Date of Patent: Mar. 2, 2021

(54) CONVOLUTIONAL NEURAL NETWORK WITH AUGMENTATION FEATURES

(71) Applicant: International Business Machines Corporation, Armonk, NY (US)

(72) Inventors: Andeep S. Toor, Chantilly, VA (US); Mohamed N. Ahmed, Leesburg, VA (US); Michelle H. Jung, Bethesda, MD (US); Krista Kinnard, Washington, DC (US); Anna Podgornyak, Arlington, VA (US); Daniel Anderson, Arlington, VA (US); Emily Fontaine, Cambridge, MA (US)

(73) Assignee: International Business Machines Corporation, Armonk, NY (US)

(*) Notice: Subject to any disclaimer, the term of this patent is extended or adjusted under 35 U.S.C. 154(b) by 114 days.

(21) Appl. No.: 16/050,298

(22) Filed: Jul. 31, 2018

(65) Prior Publication Data
US 2020/0042833 A1 Feb. 6, 2020

(51) Int. Cl.
*G06K 9/62* (2006.01)
*G06N 5/04* (2006.01)
*G06T 5/50* (2006.01)

(52) U.S. Cl.
CPC ............ *G06K 9/6267* (2013.01); *G06N 5/046* (2013.01); *G06T 5/50* (2013.01); *G06T 2207/20024* (2013.01); *G06T 2207/20084* (2013.01)

(58) Field of Classification Search
CPC ......... G06K 9/6267; G06N 5/046; G06T 5/50
(Continued)

(56) References Cited

U.S. PATENT DOCUMENTS

2013/0229439 A1* 9/2013 Freyhult ............... G06F 3/0481
345/661
2016/0148080 A1* 5/2016 Yoo ...................... G06K 9/4628
382/157

(Continued)

FOREIGN PATENT DOCUMENTS

EP 3023911 5/2016
EP 3346427 A1 7/2018

OTHER PUBLICATIONS

Mell et al., "The NIST Definition of Cloud Computing", National Institute of Standards ad Technology, U.S. Department of Commerce, NIST Special Publ. 800-145, Sep. 2011, 7 pgs.

(Continued)

*Primary Examiner* — Stephen P Coleman
(74) *Attorney, Agent, or Firm* — Heslin Rothenberg Farley & Mesiti P.C.; Michael Petrocelli, Esq.

(57) ABSTRACT

A method, computer program product, and a system where a processor(s) obtains an original image. The processor(s) applies a number of filters to the original image to generate a group of filtered images. The processor(s) stacks the original image with the filtered images in a three dimensional array; each layer of the stack comprises a separate filtered image or the original image and the three dimensional array comprises an augmented version of the original image. The processor(s) facilitates classification of the original image by a deep convolution neural network, where the facilitating comprises providing the augmented version of the original image to the deep convolution neural network, and where the deep convolution neural network classifies the original image based on applying a classification model to the augmented version of the original image The processor(s) receives the classification of the original image from the deep convolution neural network.

20 Claims, 6 Drawing Sheets

(58) Field of Classification Search
USPC .......................................................... 382/156
See application file for complete search history.

(56) References Cited

U.S. PATENT DOCUMENTS

| | | | |
|---|---|---|---|
| 2016/0366344 A1* | 12/2016 | Pan .................... | H04N 5/23216 |
| 2017/0061249 A1* | 3/2017 | Estrada ................ | G06K 9/4628 |
| 2018/0025257 A1* | 1/2018 | van den Oord ...... | G06K 9/4652 |
| | | | 375/240.14 |
| 2018/0032846 A1 | 2/2018 | Yang et al. | |
| 2018/0046898 A1 | 2/2018 | Lo | |

OTHER PUBLICATIONS

Hou et al., "An End-to-end 3D Convolutional Neural Network for Action Detection and Segmentation in Videos", Journal of Latex Class Files, vol. 114, No. 8, Aug. 2015, 15 pgs.
International Search Report and Written Opinion dated Aug. 2, 2019, PCT Application No. PCT/EP2019/063873.

* cited by examiner

CONVOLUTIONAL NEURAL NETWORK WITH AUGMENTATION FEATURES

GOVERNMENT RIGHTS STATEMENT

The invention was made with Government support. The Government has certain rights in the invention.

BACKGROUND

Neural networks are a biologically-inspired programming paradigm which enable a computer to learn from observational data. This learning is referred to as deep learning, which is a set of techniques for learning in neural networks. Neural networks, including modular neural networks, are capable of pattern recognition with speed, accuracy, and efficiency, in situations where data sets are multiple and expansive, including across a distributed network, including but not limited to, cloud computing systems. Modern neural networks are non-linear statistical data modeling tools. They are usually used to model complex relationships between inputs and outputs or to identify patterns in data (i.e., neural networks are non-linear statistical data modeling or decision making tools). In general, program code utilizing neural networks can model complex relationships between inputs and outputs and identify patterns in data. Because of the speed and efficiency of neural networks, especially when parsing multiple complex data sets, neural networks and deep learning provide solutions to many problems in image recognition, speech recognition, and natural language processing.

A class of neural network is a convolutional neural network (CNN) which utilizes feed-forward artificial neural networks and is most commonly applied to analyzing visual imagery. CNNs are so-named because they utilize convolutional layers that apply a convolution operation (a mathematical operation on two functions to produce a third function that expresses how the shape of one is modified by the other) to the input, passing the result to the next layer. The convolution emulates the response of an individual neuron to visual stimuli. Each convolutional neuron processes data only for its receptive field. It is not practical to utilize general (i.e., fully connected feedforward) neural networks to process images, as very high number of neurons would be necessary, due to the very large input sizes associated with images. Utilizing a CNN addresses this issue as it reduces the number of free parameters, allowing the network to be deeper with fewer parameters, as regardless of image size, the CNN can utilize a consistent number of learnable parameters because CNNs fine-tune large amounts of parameters and massive pre-labeled datasets to support a learning process. CNNs resolve the vanishing or exploding gradients problem in training traditional multi-layer neural networks, with many layers, by using backpropagation. Thus, CNNs are being widely used in recent large-scale (image) recognition systems, giving state-of-the-art results in segmentation, object detection and object retrieval.

CNNs can be of any number of dimensions, but most existing CNNs are two-dimensional and process single images. These images contain pixels in a two-dimensional (2D) space (length, width) that are processed through a set of two-dimensional filters in order to understand what set of pixels best correspond to the final output classification. A three-dimensional CNN (3D-CNN) is an extension of the more traditional two-dimensional CNN and a 3D-CNN is typically used in problems related to video classification. 3D-CNNs accept multiple images, often sequential image frames of a video, and use 3D filters to understand the 3D set of pixels that are presented to it.

Image classification is utilized in computer vision models that are used in many industries, including traffic, medical, and national security systems. Thus, image classification techniques that utilize CNNs have utility across all these industries.

SUMMARY

Shortcomings of the prior art are overcome and additional advantages are provided through the provision of a method for classification of an original image by a deep convolution neural network. The method includes, for instance: obtaining, by one or more processors, an original image; applying, by the one or more processors, a number of filters to the original image to generate a group of filtered images, wherein a respective filtered image, produced utilizing each filter, comprises the group of filtered images; stacking, by the one or more processors, the original image with the filtered images in a three dimensional array, the stack comprising a number of layers, wherein the number of filters is one number fewer than the number of layers, each layer of the number of layers of the stack comprises a separate filtered image or the original image, and wherein the three dimensional array comprises an augmented version of the original image; facilitating, by the one or more processors, classification of the original image by a deep convolution neural network by providing the augmented version of the original image to the deep convolution neural network, and wherein the deep convolution neural network classifies the original image based on applying a classification model to the augmented version of the original image; and obtaining, by the one or more processors, the classification of the original image from the deep convolution neural network.

Shortcomings of the prior art are overcome and additional advantages are provided through the provision of a computer program product for classification of an original image by a deep convolution neural network. The computer program product comprises a storage medium readable by a processing circuit and storing instructions for execution by the processing circuit for performing a method. The method includes, for instance: obtaining, by the one or more processors, an original image; applying, by the one or more processors, a number of filters to the original image to generate a group of filtered images, wherein a respective filtered image, produced utilizing each filter, comprises the group of filtered images; stacking, by the one or more processors, the original image with the filtered images in a three dimensional array, the stack comprising a number of layers, wherein the number of filters is one number fewer than the number of layers, each layer of the number of layers of the stack comprises a separate filtered image or the original image, and wherein the three dimensional array comprises an augmented version of the original image; facilitating, by the one or more processors, classification of the original image by a deep convolution neural network by providing the augmented version of the original image to the deep convolution neural network, and wherein the deep convolution neural network classifies the original image based on applying a classification model to the augmented version of the original image; and obtaining, by the one or more processors, the classification of the original image from the deep convolution neural network.

Methods and systems relating to one or more aspects are also described and claimed herein. Further, services relating to one or more aspects are also described and may be claimed herein.

Additional features are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 4:
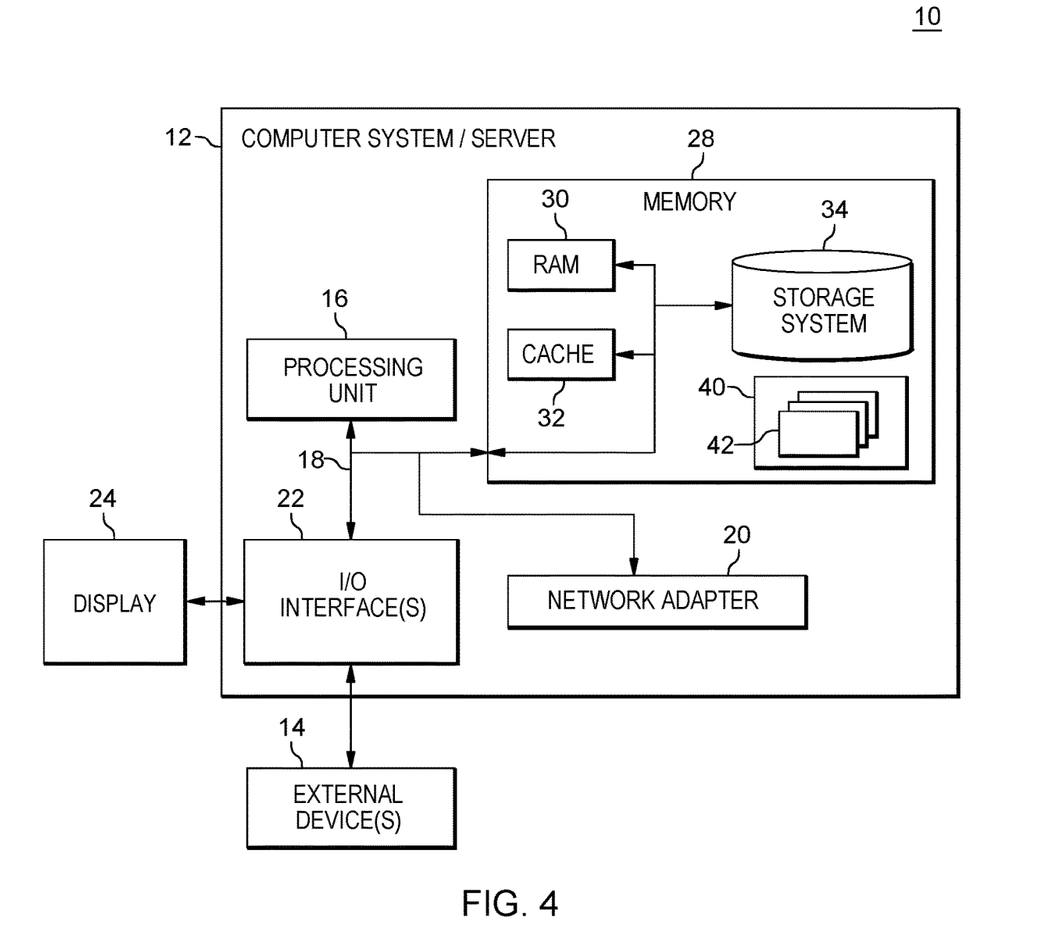
FIG. 4 depicts one embodiment of a computing node that can be utilized in a cloud computing environment.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 4 as program/utility 40, having a set (at least one) of program modules 42, may be stored in memory 28.

Embodiments of the present invention include a computer-implemented method, a computer program product, and a computer system that include program code executed on at least one processing circuit that enables an augmented 3D-CNN to utilize variants of a single image, instead of a set of different images, to classify that single image. Embodiments of the present invention can be utilized to classify both images and videos, in some embodiments, the program code treats sampled video frames as standalone images. The program code performs a method for classifying images and videos using an enhanced set of visual features combined with an N-dimensional learning model called a ND Augmented Convolutional Neural Network (ND-ACNN).

Aspects of some embodiments of the present invention include program code that performs: 1) data augmentation (through filtering and other operations); 2) correlation (through a stacking operation); and/or 3) utilization of N dimensional filters (e.g., higher dimension convolution layers). In some embodiments of the present invention, the program code, combined with the ND-ACNN: 1) receives an original image at a computer system; 2) applies N image filters to the original image, to generate N filtered images; 3) stacks the generated N filtered images and the original image in a single matrix (ND array) to produce a new image which resembles a set of layers of all derived images and the original image; and 4) feeds the new image into a ND convolution neural network (CNN) for producing ND-convolution layers and pooling the ND convolution layers. In some embodiments of the present invention, the filters can include, but are not limited to, edge detection, blurring, Laplacian of Gauissian, Unsharp masking, wavelet decomposition, and/or average object filters. In embodiments of the present invention, after augmenting the image or video data through various filters, the program code stacks the images in a manner that preserves the dimensions of the original image because output filtered images are generally of the same dimensions (including all edge images and histogram of oriented gradient) and the augmented data set (generated by the program code) can be scaled and stacked together to form layers having the same dimension as the original image.

Throughout this specification, descriptions are provided for embodiments of the present invention that utilize a three-dimensional Augmented Convolutional Neural Network (3D-ACNN). Illustrating aspects of the present invention utilizing this three-dimensional approach is provided for illustrative purposes only and because of the availability of 3D-CNNs. As understood by one of skill in the art, the approaches discussed herein, as illustrated with a 3D-ACNN, can be implemented in a CNN of any number of dimensions.

Embodiments of the present invention are inextricably tied to computing and provide advantages over existing approached to image classification. Image classification, based on NNs is inextricably tied to computing as it is not realistically performed outside of a computing system. As aforementioned, NNs are uniquely capable of pattern recognition with speed, accuracy, and efficiency, in situations where data sets are multiple and expansive, including across a distributed network, including but not limited to, in a cloud computing system. NNs can model complex relationships between inputs and outputs to identify patterns in data (i.e., neural networks are non-linear statistical data modeling or decision making tools), including in images, for classification. Because of the speed and efficiency of neural networks, especially when parsing multiple complex data sets, neural networks and deep learning provide solutions to many problems in image recognition, which are not otherwise possible outside of this technology.

In addition to being inextricably tied to computing, aspects of various embodiments of the present invention provide many technological advantages over existing image classification techniques. For example, while one existing implementation of a hardware two-dimensional CNN (2D-CNN) can accept a single 2D image as an input, this implementation, unlike embodiments of the present invention, cannot utilize a 3D-CNN to accept a set of augmented 2D images formed into a 3D stack, as input. The existing approach is further limited when compared to embodiments of the present invention because embodiments of the present invention are not constrained to a hardware implementation and can be implemented as software as well. In another existing technique, program code utilizes 2D or four-dimensional (4D) convolution to process separate parts of an image, called tiles, into different parts of an accumulation buffer. Aspects of embodiments of the present invention represent an improvement over this approach because these aspects include program code processing an entire image, instead of tiles, and creating augmented versions of these images. Embodiments of the present invention can also use 3D convolution to process the same spatial location in different augmented images together, as opposed to processing different locations based on a zero coefficient. In contrast to various embodiments of the present invention, other existing approaches limit the number of modalities utilized by a set of 2D and 3D-CNNs to process video frames, and require an input of a set of video frames. Meanwhile, embodiments of the present invention include no such limitations. Rather, in embodiments of the present invention, a single ND (e.g., 3D) CNN sees all modalities at once, as a stack containing different versions of a single image, enabling the program code to generate a model that relies on and weights different modalities, during the training phase. Additionally, the ND-CNN, in some embodiments of the present invention, does not accept, as a single input, multiple frames from a video, but instead, treats each video frame as a separate input, paired with augmented versions of that single video frame, stacked into a (e.g., 3D) representation.

Figure 1:
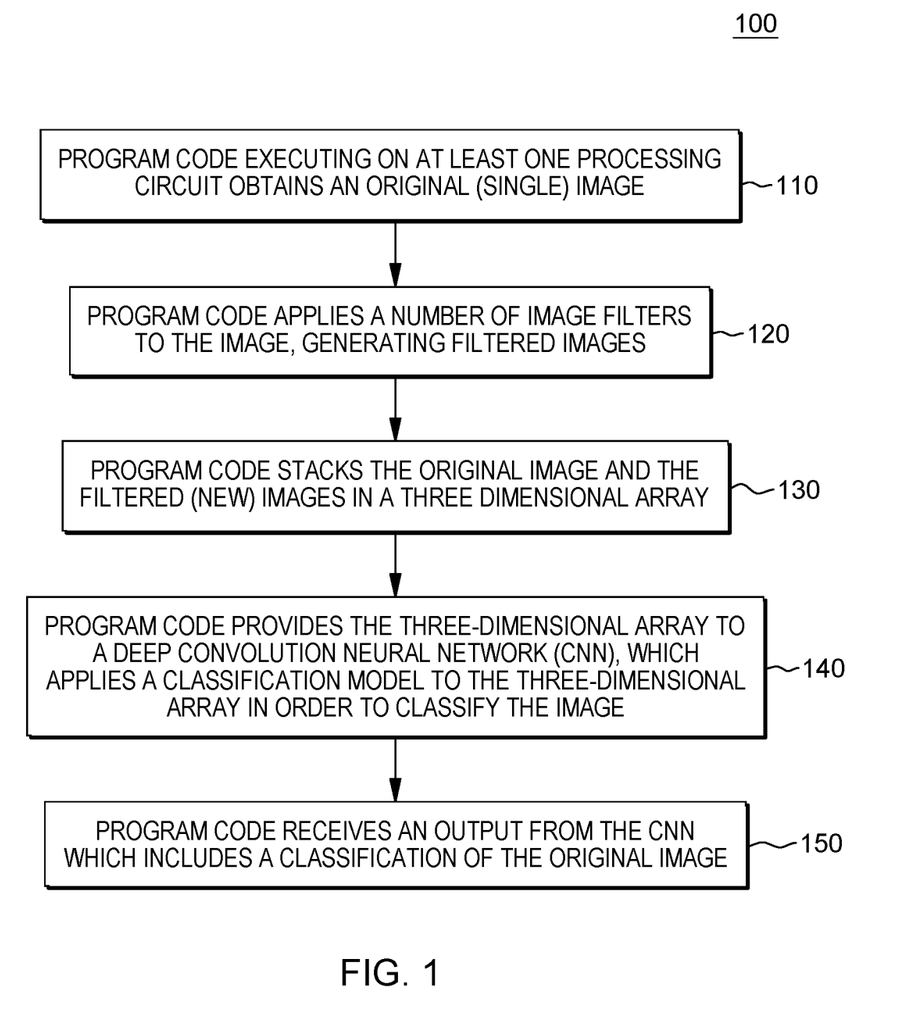
FIG. 1 is a workflow illustrating certain aspects of an embodiment of the present invention.
Figure 2:
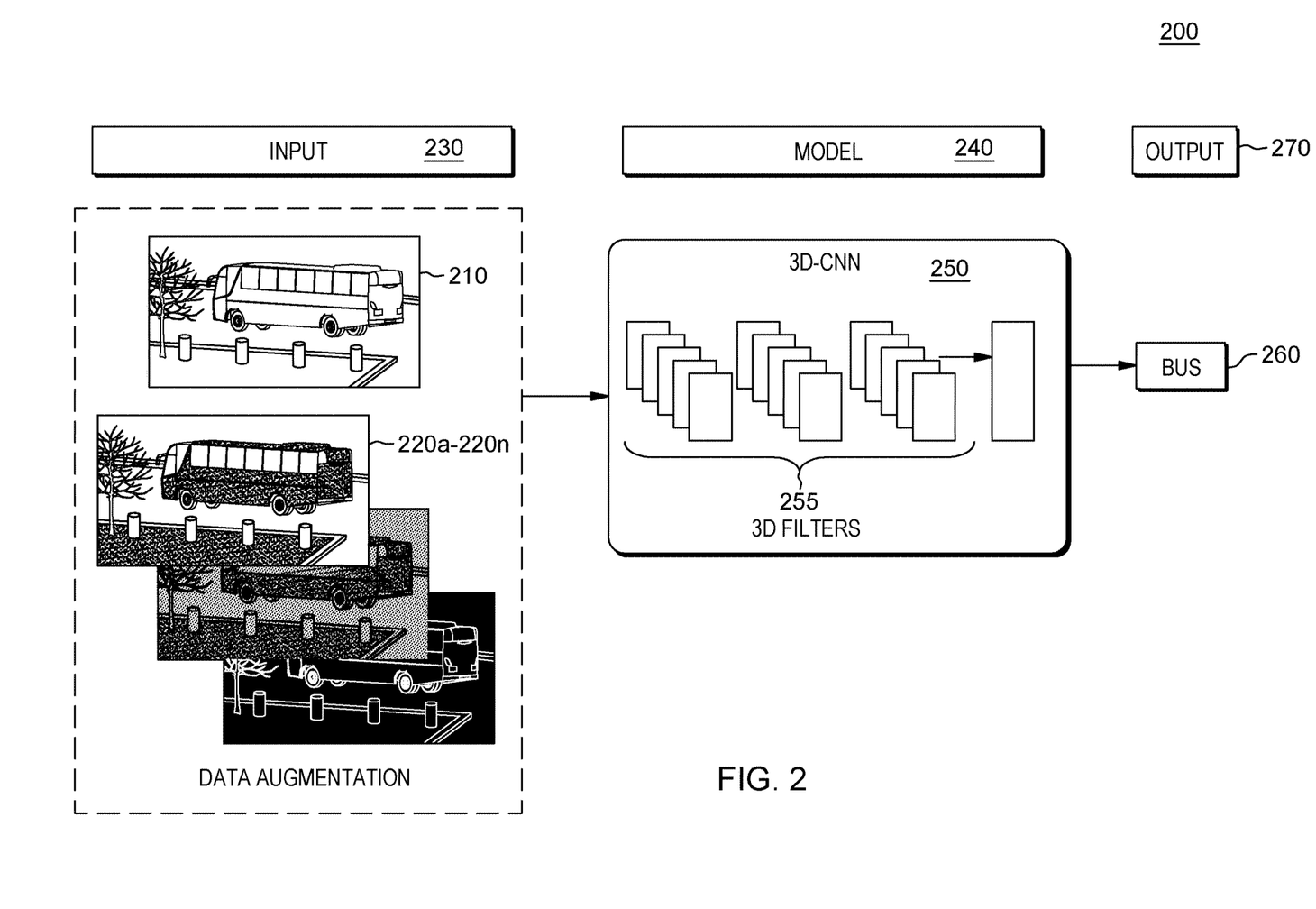
FIG. 2 is an illustration of various aspects of an embodiment of the present invention.

Embodiments of the present invention provide advantages over existing image classification techniques based on addressing known shortcomings of existing classification techniques that utilize CNNs. For example, although CNNs have been used for image classification, these CNNs frequently miss certain features when classifying images, leading to a less than ideal result. Embodiments of the present invention extract these previously missed features using the image augmentations described herein, enhancing the performance of the classification. As illustrated in FIGS. 1-2, embodiments of the present invention utilize CNNs with a tiling/stacking technique, improving the strength of the classification algorithm, e.g., n-dimensional filters, (the model) along with image augmentation. Thus, the model applied to the (augmented) image by a CNN has an enhanced capability to identify the image as one of a set of known classes.

FIG. 1 is a workflow 100 that provides a general overview of certain aspects of some embodiments of the present invention and illustrates object/image classification facilitated by aspects of some embodiments of the present invention. As illustrated in FIG. 1, embodiments of the present invention use a variant of a single image, rather than a set of different images, to classify that single image. To enable the classification of the image by a CNN, applying classification algorithms, n-dimensional filters, (i.e., a model) the program code augments the single image, such that the CNN is applying the model to an augmented version of the image, rather than to the image itself, to classify the image. Thus, the program code in embodiments of the present invention provides a CNN with an enhanced (augmented) version of an original image to utilize to classify an original image. CNNs utilized in embodiments of the present invention can comprise an architecture similar to AlexNet, but embodiments of the present invention can also utilize CNNs with higher dimension convolution layers.

In some embodiments of the present invention, program code executing on at least one processing circuit obtains an original (single) image (110). The image can be a static image or a video image from either a classified or unclassified video, including low quality video captured by an unmanned aerial vehicle (UAV). In some embodiments of the present invention, sampled video frames are treated as standalone images.

Returning to FIG. 1, the program code applies a number of image filters to the image, generating filtered images (120). In some embodiments of the present invention, the program code selects an image (e.g., X) and performs a given number (e.g., N) of varying operations (e.g., applies filters) on the image, to produce new images using unique operations (e.g., filters). In some embodiments of the present invention, the filters may include, but are not limited to: Laplacian, thresholding, canny edge detection, median blur, Gaussian blur, difference of median (DOM), difference of Gaussian (DOG), contours on canny edge detection, and/or average object (i.e., an average of per-class images in a training set akin to Eigen Faces in face-detection). In various embodiments of the present invention, the program code can produce new images by applying a variety of operations and filters to an original image, allowing flexibility across different domains.

The program code stacks the original image and the filtered (new) images in a three dimensional array (130). By stacking the (N) new images and the original image (e.g., X), the program code produces a new representation that resembles a set of layers of all derived images and the original image (e.g., image X'). The newly generated augmented image (e.g., image X') is a single representation of an extracted set of enhanced features that each represent a different version of the image, stacked together into a single representation with the original image (e.g., image X'). Depending on the stacking approach utilized by the program code, after data augmentation through various filters and operations, each filtered (new) image can keep the same dimension as the original image. Although some filters may not output the same dimensions (e.g., histogram, edges, etc.), the program code can scale the augmented data set and stack it together to form layers having the same dimension as the original image. In general, the output filtered images are of the same dimensions as the original image, including all edge images and the histogram of the oriented gradient. Thus, in embodiments of the present invention, program code correlates augmented data (filtered versions of the original image) with the original image, by stacking the augmented data and the original image as one N-dimensional volume.

Returning to FIG. 1, the program code provides the three-dimensional array (e.g., image X', the augmented image) to a deep convolution neural network (CNN), which applies a classification model (e.g., three-dimensional filters) to the three-dimensional array in order to classify the image (140). Program code in various embodiments of the present invention can supply or feed the set of layers of all derived images and the original image (e.g., image X') into either a pre-trained or a vanilla 3D-CNN. The term "trained" refers to whether the model (e.g., classification algorithms, filters) utilized by the CNN were tuned utilizing training data. In some embodiments of the present invention, the program code feeds the three-dimensional array (i.e., the newly generated image) into a 3D CNN for producing 3D-convolution layers and pooling the 3D convolution layers. In the CNN, the convolution layer applies a higher dimensional filter to the generated stack. These filters are performed for every training and test image, as part of the input to the network. The program code receives an output from the CNN which includes a classification of the original image (150).

In order to improve the efficiency of a given ND-ACNN utilized in some embodiments of the present invention, the program code trains the ND-ACNN to produce the resultant model (algorithms, methods, etc.) utilized by the ND-ACNN to classify images. When training the model utilized by the ND-ACNN, producing the model, and providing images for which the ND-ACNN applies the model to classify the images, the program code augments the image (120-130). Providing the ND-ACNN with an augmented image allows the ND-ACNN to learn features that it may not be able to create on its own and pair these features with data-driven features that the CNN naturally creates as a part of model training.

FIG. 2 provides an illustration 200 of various aspects of some embodiments of the present invention and depicts the program code generating and an augmented image and providing the augmented image to a CNN. In FIG. 2, for illustrative purposes only, the image generated by the program code is a 3D image and the CNN is a 3D-CNN. The 3D-CNN in this embodiments can be understood as a 3D-ACNN because it accepts and classifies augmented 3D images, produced by program code, in embodiments of the present invention. FIG. 2 illustrates how in the depicted embodiment of the present invention, the program code combines image processing features with a data-driven deep learning model, to produce a classification. The program code obtains an original image 210 and extracts, from the image, a set of enhanced features, by utilizing various filters to produce different versions 220a-220n of the image 210. The program code stacks these inputs 230 (the original image 210 and the different versions 220a-220n) together into a single 3D representation, which the program code provides to a model 240 generated and utilized by a CNN, in this example, a 3D-CNN 250. The input 230 provided to the CNN for image classification in embodiments of the present invention comprises a single image, which can be a frame of a video or a static image. Additionally, when classifying a sequence of images, such as a video, rather than utilizing a sequence of frames as a single input, embodiments of the present invention include augmented versions of a single image, rather than frames from a video.

Returning to FIG. 2, in embodiments of the present invention, the 3D-CNN 250 includes 3D convolution layers, pooling layers, and a fully connected output layer. The program code feeds the single 3D representation into the 3D-CNN 250 to perform the final classification, based on applying a model 240. The final classification includes the use of 3D filters 255 (e.g., in an ND-CNN, the filters would be ND). In this example, the 3D-CNN 250 outputs 270 the classification to a bus 260.

Figure 3:
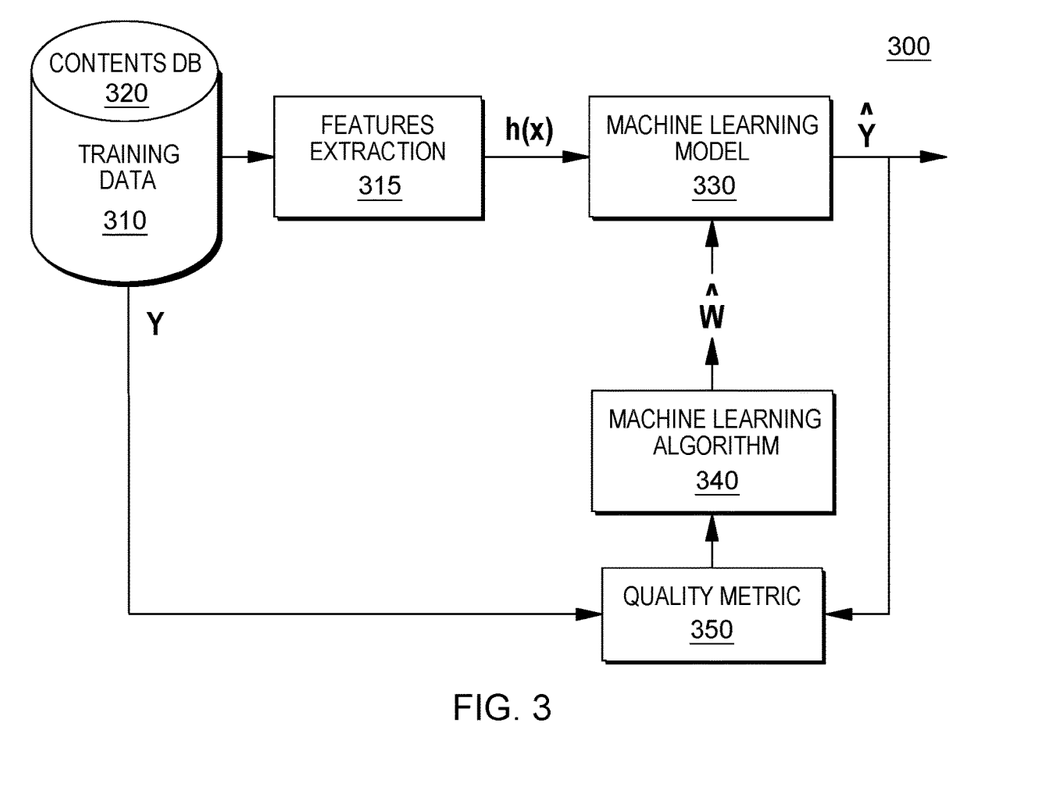
FIG. 3 is an illustration of various aspects of some embodiments of the present invention.

FIG. 3 illustrates a training system for a CNN, enabling a CNN to create and tune a model utilized to classify augmented images in some embodiments of the present invention. FIG. 3 is an example of a machine learning training system 300 that can be utilized to train the model. Machine learning (ML) solves problems that cannot be solved by numerical means alone. In this ML-based example, program code extracts various features/attributes from training data 330, which may be resident in one or more databases 320 comprising image data. The features are utilized to develop a predictor function, h(x), also referred to as a hypothesis, which the program code utilizes as a machine learning model 330. In identifying various features/attributes (e.g., patterns, utilized for image classification) in the training data 310, the program code may utilize various techniques including, but not limited to, mutual information, which is an example of a method that can be utilized to identify features in images in an embodiment of the present invention. Further embodiments of the present invention utilize varying techniques to select features (e.g., elements, patterns, attributes, etc.), including but not limited to, diffusion mapping, principal component analysis, recursive feature elimination (a brute force approach to selecting features), and/or a Random Forest, to select the features. The program code may utilize a machine learning algorithm to train the machine learning model 330 (e.g., the algorithms utilized by the program code), including providing weights for the conclusions, so that the program code can prioritize various attributes in an image, in accordance with the predictor functions that comprise the machine learning model 330. The conclusions may be evaluated by a quality metric 350. By selecting a diverse set of training data 310, the program code trains the machine learning model 330 to identify and weight various attributes (e.g., features, patterns) utilized to classify various images.

As illustrated in FIGS. 1-2, three aspects of some embodiments of the present invention include: 1) data augmentation (through filtering and other operations); 2) correlation (through stacking operation); and 3) utilization of N dimensional filters (in an ND-CNN). Below is an example of the correlation/stacking aspect in some embodiments of the present invention. In an embodiment of the present invention, the input is as follows:

$X1=60*60*t$ $X2=60*60*t,$ $X3=60*60*t$

The output is as follows:

$Y(a,b,c,0)=X1(a,b,c)$ $Y(a,b,c,1)=X2(a,b,c)$ $Y(a,b,c,2)=X3(a,b,c)$

In some embodiments of the present invention, the program code does not apply a correction in alignment. The benefit of correlation is obtained through the application of the convolution filters in the network (i.e., utilization of N dimensional filters). These filters combine values from different voxels in the input cube.

In some embodiments of the present invention, the machine learning training system 300 that can be utilized to perform cognitive analyses in embodiments of the present invention can include a trained neuromorphic chip, specifically, or a neuromorphic processor, generally. Returning to FIG. 2, the neuromorphic processor or trained neuromorphic chip can be incorporated into the computing resources that process images, in accordance with various aspects of the present invention. A neuromorphic processor may also be part of a separate computing resource that is communicatively coupled to one or more of the aforementioned resources.

One example of a trained neuromorphic chip that is utilized in an embodiment of the present invention is the IBM® TrueNorth chip, produced by International Business Machines Corporation. IBM® is a registered trademark of International Business Machines Corporation, Armonk, N.Y., U.S.A. Other names used herein may be registered trademarks, trademarks or product names of International Business Machines Corporation or other companies.

The IBM® TrueNorth chip, also referred to as TrueNorth, is a neuromorphic complementary metal-oxide-semiconductor (CMOS) chip. TrueNorth includes a manycore network on a chip design (e.g., 4096 cores), each one simulating programmable silicon "neurons" (e.g., 256 programs) for a total of just over a million neurons. In turn, each neuron has 256 programmable synapses that convey the signals between them. Hence, the total number of programmable synapses is just over 268 million (2^28). Memory, computation, and communication are handled in each of the 4096 neurosynaptic cores, so TrueNorth circumvents the von-Neumann-architecture bottlenecks and is very energy-efficient.

Embodiments of the present invention include a computer-implemented method, a computer program product, and a computer system that include program code executing on one or more processors that obtains an original image. The program code applies a number of filters to the original image to generate a group of filtered images, where a respective filtered image, produced utilizing each filter, comprises the group of filtered images. The program code stacks the original image with the filtered images in a three dimensional array, the stack including a number of layers, where the number of filters is one number fewer than the number of layers, each layer of the number of layers of the stack comprises a separate filtered image or the original image, and where the three dimensional array comprises an augmented version of the original image. The program code facilitates classification of the original image by a deep convolution neural network, wherein the facilitating comprises providing the augmented version of the original image to the deep convolution neural network, and wherein the deep convolution neural network classifies the original image based on applying a classification model to the augmented version of the original image. The program code obtains the classification of the original image from the deep convolution neural network.

In some embodiments of the present invention, the original image is selected from the group consisting of: a static image and a video frame.

In some embodiments of the present invention, the deep convolution neural network comprises an n-dimensional deep convolution neural network and the classification model comprises n-dimensional filters. In some of these embodiments of the present invention, n is equal to 3.

In some embodiments of the present invention, applying the classification model to the augmented version of the original image includes: producing, by the deep convolution neural network, 3D-convolution layers; and pooling, by the deep convolution neural network, the 3D convolution layers.

In some embodiments of the present invention, the program code trains the classification model, wherein the by: selecting a group of diverse images, wherein each image of the group has a known classification; applying the number of filters to each image of group to generate, for each image of the group, a respective group of filtered images; stacking each image of the group with the respective group of filtered images for the image in a new three dimensional array comprising an augmented version of each image; individually providing each image of the group to a deep convolution neural network, wherein the deep convolution neural network classifies each image based on producing convolution layers comprising the classification model and pooling, the convolution layers; individually obtaining the classifications each image of the group; for each image of the group, comparing the classification to the known classification; and updating the model, based on the comparing.

In some embodiments of the present invention, the program code applying the number of filters includes the program code preserving dimensions of the original image in the filtered images.

In some embodiments of the present invention, the original image comprises original dimensions and the stacking comprises scaling the filtered images to have the original dimensions.

In some embodiments of the present invention, each filter is selected from the group consisting of: Laplacian, thresholding, canny edge detection, median blur, Gaussian blur, difference of median, difference of Gaussian, contours on canny edge detection, and average object.

In some embodiments of the present invention, each filter is unique.

Referring now to FIG. 4, a schematic of an example of a computing node, which can be a cloud computing node 10. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention, the program code performing aspects illustrated in FIG. 1 executes on one or more computing resources which can each be understood as a cloud computing node 10 (FIG. 4) and if not a cloud computing node 10, then one or more general computing nodes that include aspects of the cloud computing node 10.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12 that can be utilized as cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
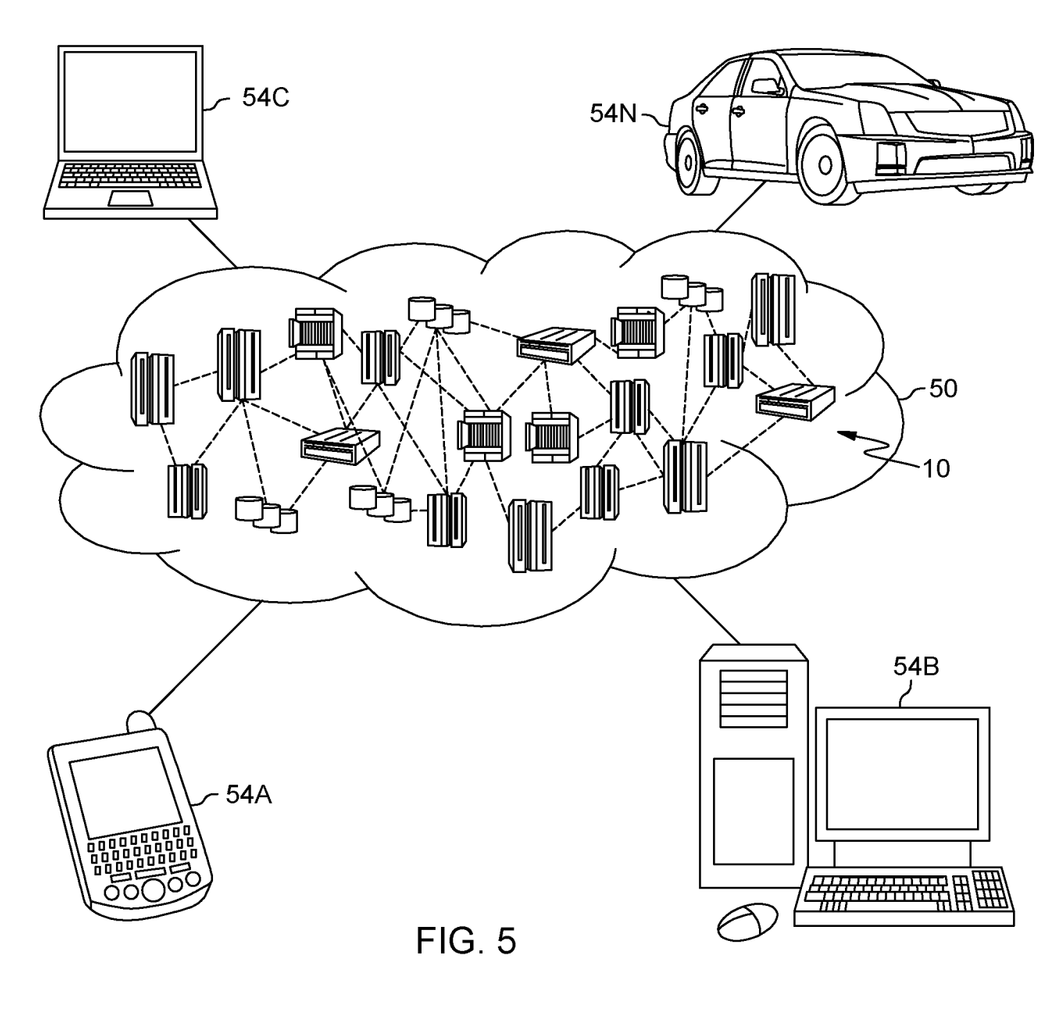
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
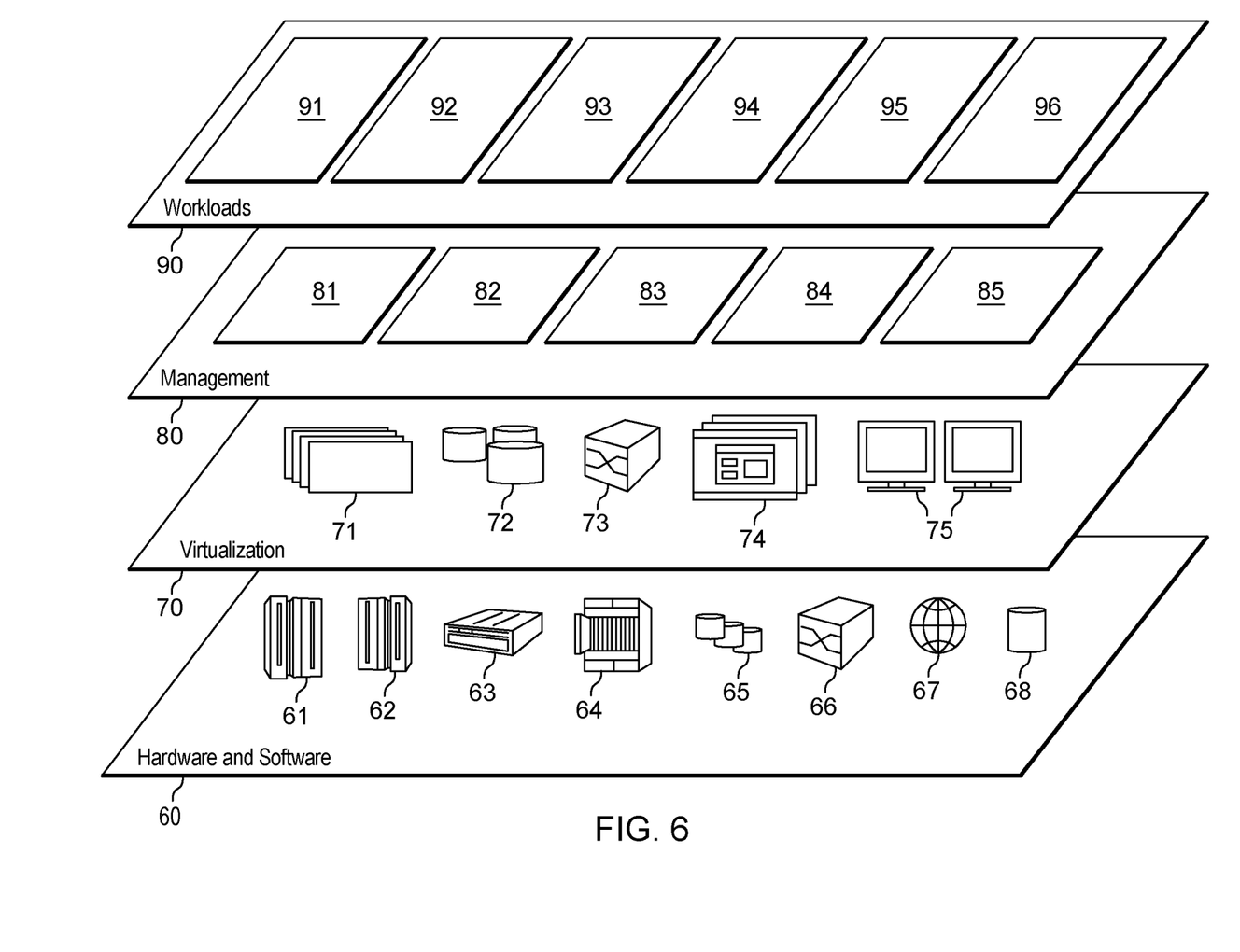
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and augmenting image data to enable image classification by a n-dimensional CNN.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising:
  training, by one or more processors, a classification model, wherein the training comprises:
   selecting, by the one or more processors, a group of diverse images, wherein each image of the group has a known classification;
   applying, by the one or more processors, a number of filters to each image of group to generate, for each image of the group, a respective group of filtered images;
   stacking, by the one or more processors, each image of the group with the respective group of filtered images for the image in a new three dimensional array comprising an augmented version of each image;
   individually providing, by the one or more processors, each image of the group to a deep convolution neural network, wherein the deep convolution neural network classifies each image into classifications based on producing convolution layers comprising the classification model and pooling, the convolution layers;

individually obtaining, by the one or more processors, the classifications of each image of the group;

for each image of the group, comparing, by the one or more processors, the classification to the known classification; and updating, by the one or more processors, the model, based on the comparing.

2. The computer-implemented method of claim 1, wherein each filter is selected from the group consisting of: Laplacian, thresholding, canny edge detection, median blur, Gaussian blur, difference of median, difference of Gaussian, contours on canny edge detection, and average object.

3. The computer-implemented method of claim 1, where each filter is unique.

4. The computer-implemented method of claim 1, wherein the deep convolution neural network comprises an n-dimensional deep convolution neural network and the classification model comprises n-dimensional filters.

5. The computer-implemented method of claim 4, where n is equal to 3.

6. The computer-implemented method of claim 1, further comprising:

obtaining, by the one or more processors, an original image;

applying, by the one or more processors, the number of filters to the original image to generate a group of filtered images, wherein a respective filtered image, produced utilizing each filter, comprises the group of filtered images;

stacking, by the one or more processors, the original image with the filtered images in a three dimensional array, the stack comprising a number of layers, wherein the number of filters is one number fewer than the number of layers, wherein one layer of the number of layers of the stack comprises the original image and the remaining layers of the number of layers of the stack each comprise a separate filtered image, wherein each separate filtered image is of the same dimensions as the original image, wherein the three dimensional array comprises an augmented version of the original image, and wherein the augmented version of the original image is a single representation of an extracted set of enhanced features that each represent a different version of the image, stacked together into the single representation with the original image;

facilitating, by the one or more processors, classification of the original image by a deep convolution neural network by providing the augmented version of the original image to the deep convolution neural network, and wherein the deep convolution neural network classifies the original image based on applying the classification model to the single representation to classify the original image; and obtaining, by the one or more processors, the classification of the original image from the deep convolution neural network based on the classification model classifying the augmented version.

7. The computer-implemented method of claim 6, wherein the original image is selected from the group consisting of: a static image and a video frame.

8. The computer-implemented method of claim 6, wherein applying the classification model to the augmented version of the original image further comprises:

producing, by the deep convolution neural network, 3D-convolution layers; and pooling, by the deep convolution neural network, the 3D convolution layers.

9. The computer-implemented method of claim 6, wherein each separate filtered image is of the same dimensions as the original image based on applying the number of filters comprising preserving, by the one or more processors, dimensions of the original image in the filtered images.

10. The computer-implemented method of claim 6, wherein the original image comprises original dimensions, and wherein each separate filtered image is of the same dimensions as the original image based on the stacking comprising scaling the filtered images to have the original dimensions.

11. A computer program product comprising:

a non-transitory computer readable storage medium readable by one or more processors and storing instructions for execution by the one or more processors for performing a method comprising:

training, by the one or more processors, a classification model, wherein the training comprises:

selecting, by the one or more processors, a group of diverse images, wherein each image of the group has a known classification;

applying, by the one or more processors, a number of filters to each image of group to generate, for each image of the group, a respective group of filtered images;

stacking, by the one or more processors, each image of the group with the respective group of filtered images for the image in a new three dimensional array comprising an augmented version of each image;

individually providing, by the one or more processors, each image of the group to a deep convolution neural network, wherein the deep convolution neural network classifies each image into classifications based on producing convolution layers comprising the classification model and pooling, the convolution layers;

individually obtaining, by the one or more processors, the classifications of each image of the group;

for each image of the group, comparing, by the one or more processors, the classification to the known classification; and updating, by the one or more processors, the model, based on the comparing.

12. The computer program product of claim 11, wherein each filter is selected from the group consisting of: Laplacian, thresholding, canny edge detection, median blur, Gaussian blur, difference of median, difference of Gaussian, contours on canny edge detection, and average object, and where each filter is unique.

13. The computer program product of claim 11, wherein the deep convolution neural network comprises an n-dimensional deep convolution neural network and the classification model comprises n-dimensional filters.

14. The computer program product of claim 13, where n is equal to 3.

15. The computer program product of claim 11, the method further comprising:
  obtaining, by the one or more processors, an original image;
  applying, by the one or more processors, the number of filters to the original image to generate a group of filtered images, wherein a respective filtered image, produced utilizing each filter, comprises the group of filtered images;
  stacking, by the one or more processors, the original image with the filtered images in a three dimensional array, the stack comprising a number of layers, wherein the number of filters is one number fewer than the number of layers, wherein one layer of the number of layers of the stack comprises the original image and the remaining layers of the number of layers of the stack each comprise a separate filtered image, wherein each separate filtered image is of the same dimensions as the original image, wherein the three dimensional array comprises an augmented version of the original image, and wherein the augmented version of the original image is a single representation of an extracted set of enhanced features that each represent a different version of the image, stacked together into the single representation with the original image;
  facilitating, by the one or more processors, classification of the original image by a deep convolution neural network by providing the augmented version of the original image to the deep convolution neural network, and wherein the deep convolution neural network classifies the original image based on applying the classification model to the single representation to classify the original image; and
  obtaining, by the one or more processors, the classification of the original image from the deep convolution neural network based on the classification model classifying the augmented version.

16. The computer program product of claim 15, wherein the original image is selected from the group consisting of: a static image and a video frame.

17. The computer program product of claim 15, wherein applying the classification model to the augmented version of the original image further comprises:
  producing, by the deep convolution neural network, 3D-convolution layers; and
  pooling, by the deep convolution neural network, the 3D convolution layers.

18. The computer program product of claim 15, wherein each separate filtered image is of the same dimensions as the original image based on applying the number of filters comprising preserving, by the one or more processors, dimensions of the original image in the filtered images.

19. The computer program product of claim 15, wherein the original image comprises original dimensions, and wherein each separate filtered image is of the same dimensions as the original image based on the stacking comprising scaling the filtered images to have the original dimensions.

20. A system comprising:
  a memory;
  one or more processors in communication with the memory;
  program instructions executable by the one or more processors via the memory to perform a method, the method comprising:
    training, by the one or more processors, a classification model, wherein the training comprises:
      selecting, by the one or more processors, a group of diverse images, wherein each image of the group has a known classification;
      applying, by the one or more processors, a number of filters to each image of group to generate, for each image of the group, a respective group of filtered images;
      stacking, by the one or more processors, each image of the group with the respective group of filtered images for the image in a new three dimensional array comprising an augmented version of each image;
      individually providing, by the one or more processors, each image of the group to a deep convolution neural network, wherein the deep convolution neural network classifies each image into classifications based on producing convolution layers comprising the classification model and pooling, the convolution layers;
      individually obtaining, by the one or more processors, the classifications of each image of the group;
      for each image of the group, comparing, by the one or more processors, the classification to the known classification; and
      updating, by the one or more processors, the model, based on the comparing;
    obtaining, by the one or more processors, an original image;
    applying, by the one or more processors, a number of filters to the original image to generate a group of filtered images, wherein a respective filtered image, produced utilizing each filter, comprises the group of filtered images;
    stacking, by the one or more processors, the original image with the filtered images in a three dimensional array, the stack comprising a number of layers, wherein the number of filters is one number fewer than the number of layers, wherein one layer of the number of layers of the stack comprises the original image and the remaining layers of the number of layers of the stack each comprise a separate filtered image, wherein each separate filtered image is of the same dimensions as the original image, wherein the three dimensional array comprises an augmented version of the original image, and wherein the augmented version of the original image is a single representation of an extracted set of enhanced features that each represent a different version of the image, stacked together into the single representation with the original image;
    facilitating, by the one or more processors, classification of the original image by a deep convolution neural network by providing the augmented version of the original image to the deep convolution neural network, and wherein the deep convolution neural network classifies the original image based on applying a classification model to the single representation to classify the original image; and obtaining, by the one or more processors, the classification of the original image from the deep convolution neural network based on the classification model classifying the augmented version.

* * * * *